(12) United States Patent
Sorge et al.

(10) Patent No.: US 10,693,350 B2
(45) Date of Patent: Jun. 23, 2020

(54) ELECTRIC MACHINE COOLING SYSTEM AND MOTOR VEHICLE

(71) Applicant: AUDI AG, Ingolstadt (DE)

(72) Inventors: Martin Sorge, Ingolstadt (DE); Bastian Heidler, Kranzberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/109,951

(22) Filed: Aug. 23, 2018

(65) Prior Publication Data

US 2019/0123623 A1 Apr. 25, 2019

(30) Foreign Application Priority Data

Oct. 23, 2017 (DE) .................. 10 2017 218 865

(51) Int. Cl.
| | |
|---|---|
| H02K 11/40 | (2016.01) |
| H02K 7/00 | (2006.01) |
| H02K 9/19 | (2006.01) |
| H02K 5/20 | (2006.01) |
| H02K 1/32 | (2006.01) |
| B60K 1/00 | (2006.01) |
| B60K 6/26 | (2007.10) |
| B60R 16/03 | (2006.01) |

(52) U.S. Cl.
CPC ............ *H02K 11/40* (2016.01); *H02K 7/003* (2013.01); *H02K 9/19* (2013.01); *B60K 1/00* (2013.01); *B60K 6/26* (2013.01); *B60K 2001/006* (2013.01); *B60R 16/03* (2013.01); *B60Y 2200/91* (2013.01); *B60Y 2200/92* (2013.01); *H02K 1/32* (2013.01); *H02K 5/20* (2013.01)

(58) Field of Classification Search
CPC ...................................................... H02K 11/40
USPC ..................................................... 310/52–65
See application file for complete search history.

(56) References Cited

U.S. PATENT DOCUMENTS

| | | | |
|---|---|---|---|
| 6,191,511 B1 * | 2/2001 | Zysset | H02K 9/19 310/53 |
| 7,414,338 B2 | 8/2008 | Endo et al. | |
| 8,651,745 B2 | 2/2014 | Mayr et al. | |
| 2009/0126922 A1 | 5/2009 | Vetrovec | |
| 2014/0015351 A1 * | 1/2014 | Marvin | H02K 9/16 310/54 |
| 2015/0035392 A1 * | 2/2015 | Pal | H02K 7/14 310/54 |

FOREIGN PATENT DOCUMENTS

| | | |
|---|---|---|
| DE | 44 20 250 A1 | 12/1995 |
| DE | 693 14 097 T2 | 2/1998 |

(Continued)

OTHER PUBLICATIONS

Machine translation of DE-69314097-T2 retrieved from EPO.*

(Continued)

*Primary Examiner* — Quyen P Leung
*Assistant Examiner* — Minki Chang
(74) *Attorney, Agent, or Firm* — Maier & Maier, PLLC

(57) ABSTRACT

An electric machine, having a shaft as well as a cooling system, which has at least one cooling channel formed by at least one component of the electric machine. The cooling system is filled with an electrically conductive coolant. The shaft is in electrical contact with the coolant and is grounded via the coolant.

10 Claims, 2 Drawing Sheets

(56) References Cited

FOREIGN PATENT DOCUMENTS

| DE | 69314097 T2 * | 2/1998 | ............... F16J 15/43 |
|----|---|---|---|
| DE | 10 2004 050134 A1 | 7/2005 | |
| DE | 10 2009 036 856 A1 | 2/2011 | |
| DE | 10 2010 062 790 A1 | 6/2012 | |
| DE | 10 2015 218 519 A1 | 9/2016 | |
| DE | 10 2015 218 521 A1 | 9/2016 | |
| DE | 102018204691 A1 * | 10/2019 | ......... E04G 21/3223 |
| EP | 1 705 778 A1 | 9/2006 | |
| EP | 2 852 030 A1 | 3/2015 | |
| WO | 2014/011511 A2 | 1/2014 | |
| WO | 2016/039258 A1 | 3/2016 | |
| WO | WO-2016039258 A1 * | 3/2016 | ............... F16J 15/10 |

OTHER PUBLICATIONS

Machine translation of DE-102018201691-A1 retrieved from EPO.*
Machine translation of WO-2016039258-A1 retrieved from EPO.*
German Office Action dated Sep. 12, 2018, in connection with corresponding DE Application No. 10 2017 218 865.0 (8 pgs.).
Search Report dated Jan. 31, 2019 in corresponding European Application No. 18186302.8; 12 pages including partial machine-generated English-language translation.
Examination Report dated Nov. 13, 2019, in corresponding European Application No. 18186302.8; including partial machine-generated English-language translation; 13 pages.
Examination Report dated Mar. 6, 2020 in corresponding European Application No. 18 186 302.8; 6 pages including partial machine-generated English-language translation.

* cited by examiner

ELECTRIC MACHINE COOLING SYSTEM AND MOTOR VEHICLE

FIELD

The invention relates to an electric machine comprising a shaft as well as a cooling system that comprises at least one cooling channel formed by at least one component of the electric machine, wherein the cooling system is filled with an electrically conductive coolant. The invention further relates to a motor vehicle.

BACKGROUND

For the dissipation of heat produced during operation, electric machines, such as motors and/or generators have cooling systems filled with a coolant, wherein it is possible to achieve a dissipation of heat by circulation of the coolant, for example.

Electric machines of this kind are known from the prior art.

Thus, WO 2014/011 511 A2 describes an electric machine that is cooled by a conductive cooling fluid, wherein the cooling fluid flows through a cooling channel arrangement that is arranged in direct contact with stator windings of the electric machine. In this case, the component having the cooling channels is arranged between the stator windings and the associated stator yoke. A gap or an insulating layer is situated between the component having the cooling channels and the stator winding, in order to prevent the occurrence of eddy currents.

EP 2 852 030 A1 describes a cooling device for an electric machine with a stator that comprises at least one stator winding and at least one laminated stator core with at least one stator winding head, wherein the cooling device, which comprises a plurality of channels through which a coolant can flow, are connected at a first terminal section to a pressure reservoir and at their second terminal section end at a baffle cooling plate of the stator winding head. In this case, it needs to be ensured that, in the case of a conductive coolant, no short circuit is created between electrically conducting components of the electric machine.

Furthermore, it is generally known that a shaft grounding that is required under certain circumstances for grounding the shaft of the electric machine can be realized by an electrical contact at the shaft by way of, for example, a sliding contact. Such a shaft grounding serves, for example, for electromagnetic compatibility of the electric machine and for reduction of bearing currents, which can lead to an increased wear of the shaft bearings of the electric machine.

SUMMARY

The invention is therefore based on the object of presenting an electric machine with an improved shaft grounding.

In order to achieve this object, it is provided in accordance with the invention that the shaft is in electrical contact with the coolant and is grounded via the coolant.

The invention offers the advantage that no additional components are required for the shaft grounding. The construction of the electric machine is simplified thereby, and the utilization of components, such as sliding contacts, which are subject to mechanical wear, is avoided. The electrical contact provided in accordance with the invention between the shaft and the conductive coolant can, for example, be produced through a direct contact of the shaft with the coolant. By way of the electrically conductive coolant, the shaft is then connected to a ground potential in an electrically conductive manner, as a result of which a grounding of the shaft is achieved. In this case, the conductivity of the coolant is to be chosen in such a way that, on the basis of the operation of the electric machine, electric charges accumulating on the shaft are drained off, at least in part, by way of the electrically conductive coolant before a total charge having the magnitude of a charge limit can form on the shaft. In this way, it is achieved that the total charge on the shaft always remains below the charge limit, wherein the charge limit can describe the charge on the shaft, starting from which a draining of charge is produced by way of at least one shaft bearing in which the shaft is mounted. Additionally or alternatively to this, the charge limit can also be chosen such that any interference due to electric fields arising from the charge, such as, for example, an interference of AM radio reception, is prevented, based on the grounding of the shaft via the electrically conductive coolant.

For the coolant present in the cooling system, it can be provided, in particular, that said coolant circulates through the cooling system, so that, besides the shaft grounding, also an efficient uptake of heat as well as a discharge of heated coolant are possible.

In a preferred embodiment of the electric machine, it can be provided that the coolant circulates through the interior of the electric machine, and/or in that the shaft has a shaft cooling channel that extends in the interior thereof, communicates with the cooling system, and is filled with the coolant. In this way, the interior of the electric machine can comprise the space in which a stator and a rotor arranged on the shaft of the electric machine are situated. In this case, it is necessary that there is insulation between the electrically conductive coolant and the rotor or the stator in order to prevent an electric short circuit in the interior of the electric machine. In this case, however, the electrically conductive coolant can flow around the shaft, at least in part, so that an electrical contact between the shaft and the electrically conductive coolant for grounding of the shaft is provided. Additionally or alternatively to this, the shaft can have a shaft cooling channel that extends in the interior thereof, communicates with the cooling system, and is filled with the coolant. Said shaft cooling channel can be connected, for example, to an interior of the machine through which the electrically conductive coolant flows, so that, by way of the shaft cooling channel extending in the interior of the shaft, a direct contact between the shaft and the coolant present in the shaft cooling channel is created. It is also possible, in particular in the case of an electric machine whose interior is not filled with the coolant, for the shaft cooling channel to communicate with the cooling system of the electric machine in such a way that, via the cooling system, a supply or discharge of coolant present in the interior of the shaft cooling channel is made possible. In this case, too, a grounding of the shaft is achieved via the contact of the shaft with the coolant residing or flowing in the interior of the shaft cooling channel.

For grounding of the coolant, it can be provided in accordance with the invention that the coolant is in contact with at least one conductive wall section of at least one cooling channel of the cooling system, wherein the conductive wall section is electrically connected to a ground potential, and/or that the coolant is in contact with at least one electrode that is electrically connected to a ground potential. For example, in the interior of at least one cooling channel, it is possible to provide one wall section or a plurality of wall sections of the cooling channel made from a conductive material, such as, for example, a metal, which is or are in direct contact with the electrically conductive coolant. Through a connection of the wall section or wall sections to a ground potential, a grounding of the coolant present in the interior of the cooling channel can be achieved. Additionally or alternatively to this, it is possible to provide at least one electrode, which is arranged in such a way that it protrudes into the interior of the cooling system or into the interior of at least one cooling channel, so that the coolant is in direct contact with the electrode. Through a connection of the electrode to a ground potential, it is possible to ground the coolant.

For the coolant, it can be provided in accordance with the invention that it is a liquid or a liquid mixture. The coolant can be, for example, a liquid, such as water or oil, or a liquid mixture can be used, such as, for example, a water-glycol mixture. In particular, it can be provided that the coolant is of such a nature that it has a conductivity based on which a total resistance between the shaft and the ground of less than 1 Ohm results. The total resistance between the shaft and the ground, for example, can describe a total resistance between the shaft and a grounded housing of the electric machine, that is, a housing of the electric machine lying at ground potential, wherein, in particular, the contact resistances between the shaft and the coolant or between the coolant and a conductive wall section and/or an electrode, which depend on the nature of the coolant, are also to be taken into consideration, in addition to the dimensions and/or the geometry of the electric machine. With a total resistance of this kind, an especially efficient dissipation of electrical charges accumulating on the motor shaft and consequently, therefore, an especially efficient grounding of the shaft is made possible.

Furthermore, it can be provided that an additive that increases the electrical conductivity is added to the liquid or the liquid mixture. Through addition of this additive, the electrical conductivity of the coolant can be increased to above the value of the electrical conductivity that the liquid or the liquid mixture would have without the additive. The additive can be a solid, which is dissolved in the coolant and, in this way, through the formation of ions or charged molecules, for example, increases the conductivity of the coolant. Additionally or alternatively to this, it is also possible to use additives that are themselves liquids and thereby mix with the coolant in such a way that the electrical conductivity of the coolant is increased by the additive. Thus, for example, the addition of acids, bases, salts, and/or other soluble solids is conceivable, which, after dissolution in or mixing with the coolant, increase the conductivity thereof in such a way that a grounding of the shaft by way of the coolant is made possible.

In a preferred embodiment of the invention, it can be provided that the electric machine comprises a housing, wherein the housing has at least one connection that communicates with the cooling system, and with which the cooling system is connected to or can be connected to a cooling circuit. By way of the at least one connection that communicates with the cooling system, coolant can accordingly be fed to the cooling system through a cooling circuit and a recovery of the fed coolant can be produced, for example, via a drain in a coolant sump of the electric machine or via another connection communicating with the cooling system. In this case, the additional connection can be arranged, in particular, in such a way that a coolant fed to a first connection can flow through the entire cooling system before it leaves the cooling system through the additional connection.

For a motor vehicle according to the invention, it is provided that it comprises at least one electric machine according to the invention. The electric machine can be, for example, a traction motor of the motor vehicle or a generator for generating current—for example, for recovering braking energy. In this case, a connection of the cooling system of the at least one electric machine can be produced, for example, to a gearbox cooling circuit of the motor vehicle or to a cooling circuit of an internal combustion engine that is additionally present in the motor vehicle. Alternatively, the cooling circuit of the electric machine can also be connected to its own cooling circuit, which, for example, comprises a pump and a heat exchanger, which are connected via coolant lines to each other and to the electric machine for circulation of the coolant.

BRIEF DESCRIPTION OF THE DRAWINGS

Further advantages and details ensue from the exemplary embodiments described below as well as on the basis of the drawings. Shown herein are.

DETAILED DESCRIPTION

Figure 1:
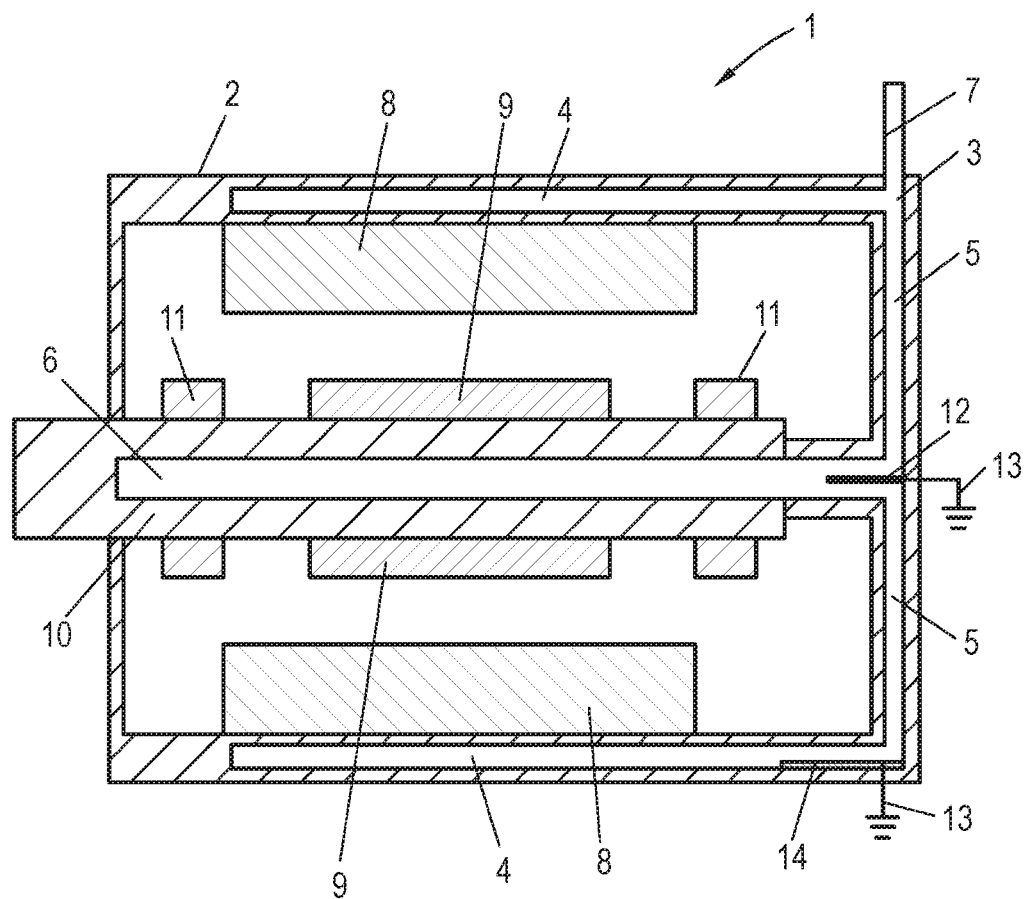
FIG. 1 a sectional schematic illustration of a side view of a first exemplary embodiment of an electric machine.

FIG. 1 shows a sectional schematic illustration of a side view of an electric machine 1 according to the invention. The electric machine 1 comprises a housing 2 as well as a cooling system 3, which comprises cooling channels 4, 5 formed by the housing. Furthermore, the electric machine 1 comprises a shaft 10 with a shaft cooling channel 6.

In this case, the cooling channels 4 extending in the jacket of the housing 2 are in communication connection with the shaft cooling channel 6 via the cooling channels 5. Furthermore, the housing 2 comprises a connection 7 that corresponds to the cooling system 3, with which the cooling system 3 of the electric machine 1 can be connected to a cooling circuit. Furthermore, the electric machine 1 comprises a stator 8, which is fastened to the housing 2, as well as a rotor 9, which is fastened to the shaft 10. The shaft 10 is rotatably mounted by two shaft bearings 11.

The cooling system 3 as well as the shaft cooling channel 6 are filled with an electrically conductive coolant, such as, for example, an electrically conductive liquid or an electrically conductive liquid mixture. Via an electrode 12 that protrudes into the interior of the cooling system 3 and is in contact with the coolant present in the interior of the cooling system 3, a grounding 13 (illustrated schematically here) occurs. The grounding can be produced, for example, through the connection of the electrode 12 to a ground potential—for example, to the housing. Via the contact of the shaft 10 with the electrically conductive coolant present in the shaft cooling channel 6, a grounding of the shaft 10 is likewise produced. Electric charges accumulating on the shaft 10 during operation of the electric machine can thus drain off via the electrically conductive coolant, so that interferences due to accumulated charges as well as a dissipation of charges via one or both of the shaft bearings 11 can be prevented.

The cooling system 3 can comprise additional cooling channels and connections, which are not illustrated here, by way of which a circulation of the coolant in the interior of the cooling system 3 is made possible when there is a connection to a coolant circuit. In this case, the additional cooling channels can be arranged, in particular, in such a way that coolant can flow completely through cooling channels 4 arranged in the jacket of the housing as well as through the shaft cooling channel 6.

Additionally or alternatively to the electrode 12, it is possible to provide at least one conductive wall section 14, which is situated in contact with the coolant present in the interior of the cooling system 3. The at least one wall section can also have a grounding 13 through connection to an external ground potential, so that, by way of the conductive wall section 14 and the contact to the coolant, a grounding of the shaft 10 is also made possible. Alternatively to this, it can be provided that the cooling channels 4, 5 formed by the housing 2 have conductive outer walls formed by a conductive housing 2, so that the coolant present in the interior of the cooling system 3 is connected in an electrically conductive manner to the housing 2 via the entire outer surfaces of the cooling channels 4, 5. In this case, a grounding of the electrically conductive coolant or of the shaft can be produced by way of a connection of the housing 2 to a corresponding grounding (not illustrated here).

Figure 2:
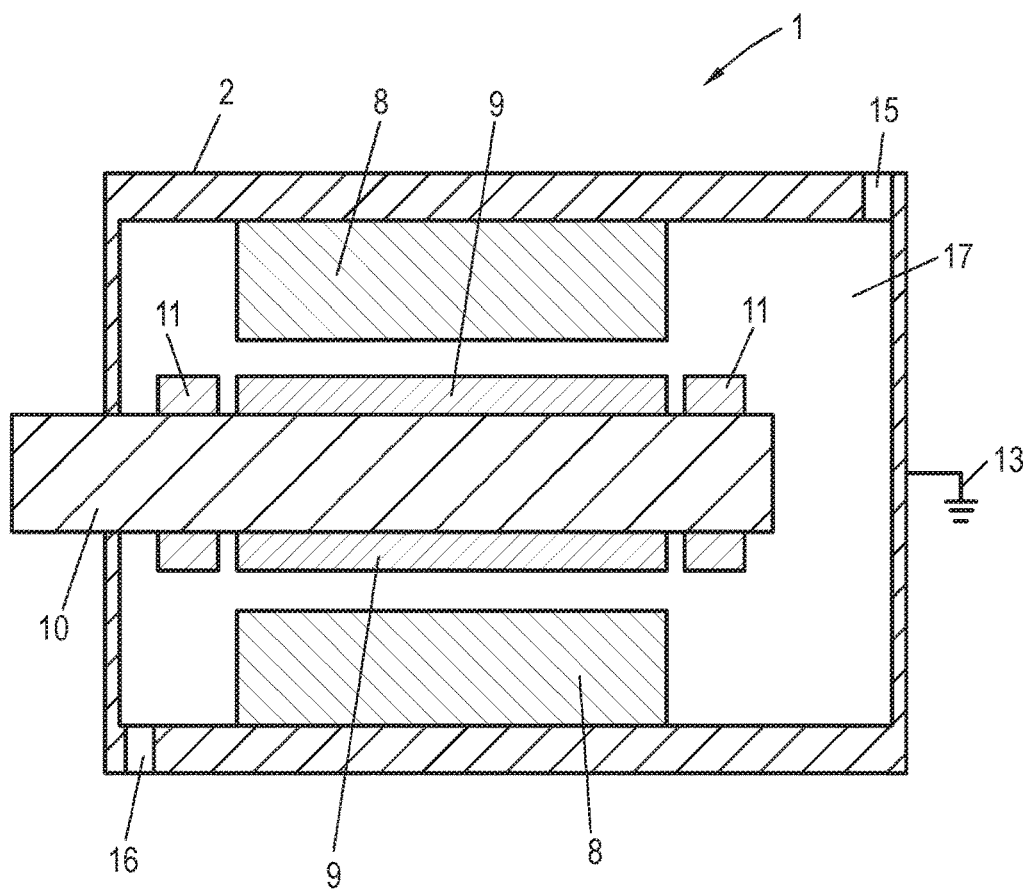
FIG. 2 a sectional schematic illustration of a side view of a second exemplary embodiment of an electric machine according to the invention.

Shown in FIG. 2 is a sectional schematic illustration of a side view of another exemplary embodiment of an electric machine 1 according to the invention. Components that are functionally identical to those of the illustration in FIG. 1 have the same reference numbers and will not be discussed in more detail. In this exemplary embodiment, the housing 2 of the electric machine 1 shown is composed of a conductive material and has a connection 15 arranged on the top of the housing 2 as well as a connection 16 arranged on the bottom of the housing. The connections 15, 16 correspond to the interior 17 of the electric machine 1, so that, when an electrically conductive coolant is fed through the connection 15, for example, coolant flows through the interior 17 of the electric machine 1, with the coolant again subsequently leaving the interior 17 through the connection 16. A cooling of the entire interior 17 of the electric machine 1 is thereby achieved. In this exemplary embodiment, the interior 17 represents a cooling channel of a cooling system of the electric machine 1. The electrically conductive coolant is in direct contact with the housing 2, which is composed of an electrically conductive material, with the housing 2 having a grounding 13 through a connection to a ground potential. In this case, a grounding of the shaft 10 is produced by way of the direct contact of the shaft 10 with the coolant flowing through the interior 17 of the electric machine 1. In this embodiment, it is to be noted that the rotor 9 and/or the stator 8 need to be of such a nature that a short circuit within the rotor 9 or the stator 8 or a short circuit between the rotor 9 and the stator 8 or other components of the machine is prevented. This can be achieved, for example, by placing a suitable insulation on the rotor and/or on the stator and/or on other components of the electric machine 1.

Figure 3:
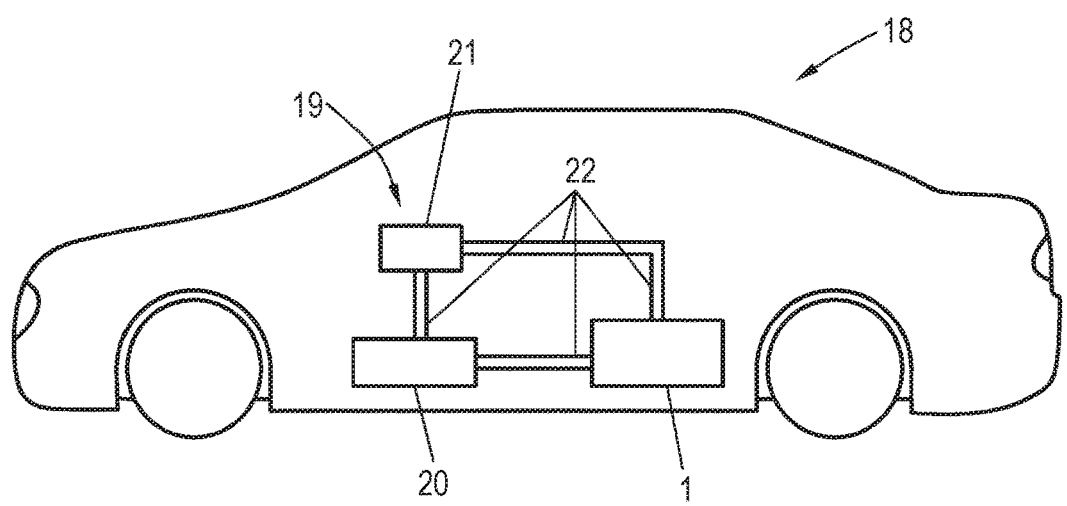
FIG. 3 a schematic side view of a motor vehicle according to the invention.

FIG. 3 shows a schematic side illustration of a motor vehicle 18 according to the invention. The motor vehicle 18 comprises an electric machine 1, which serves as a traction motor of the motor vehicle 18. Additionally or alternatively to this, the motor vehicle 18 can also comprise one or a plurality of electric machines 1, which are used as generators for producing electrical energy or as motors, such as, for example, as starters, or are used for actuating vehicle components. The electric machine 1 is connected to a cooling circuit 19 of the motor vehicle 18. In this case, the cooling circuit 19 comprises a heat exchanger 20, a pump 21, and a plurality of coolant lines 22 that connect the electric machine 1, the heat exchanger 20, and the pump 21 to one another and create a circuit. It is possible to connect to the coolant circuit 19 other components of the motor vehicle 18, such as, for example, a gearbox and/or an internal combustion engine that is additionally present in the motor vehicle 18.

The invention claimed is:

1. An electric machine, comprising:
   a shaft as well as a cooling system, with at least one cooling channel formed by at least one component of the electric machine, wherein the cooling system is filled with an electrically conductive coolant, wherein the shaft is in electrical contact with the coolant and is grounded via the coolant, wherein the shaft has a shaft cooling channel, wherein the shaft cooling channel extends in the interior of the shaft, is in fluid communication with the cooling system, and is filled with the electrically conductive coolant.

2. The electric machine according to claim 1, wherein the coolant is in contact with at least one conductive wall section of at least one cooling channel of the cooling system, wherein the conductive wall section is electrically connected to a ground potential, and/or the coolant is in contact with at least one electrode that is electrically connected to a ground potential.

3. The electric machine according to claim 1, wherein the coolant is a liquid or a liquid mixture.

4. The electric machine according to claim 3, wherein at least one additive that increases the electrical conductivity is added to the liquid or the liquid mixture.

5. The electric machine according to claim 1, wherein the electric machine comprises a housing, wherein the housing has at least one connection communicating with the cooling system, with which the cooling system is connected or can be connected to a cooling circuit.

6. An electric machine, comprising:
   a shaft as well as a cooling system, with at least one cooling channel formed by at least one component of the electric machine, wherein the cooling system is filled with an electrically conductive coolant, wherein the shaft is in electrical contact with the coolant and is grounded via the coolant, wherein the coolant flows through an interior of the electric machine, wherein the interior of the electric machine comprises a space in which a stator and/or a rotor arranged on the shaft are disposed.

7. The electric machine according to claim 6, wherein the coolant is in contact with at least one conductive wall section of at least one cooling channel of the cooling system, wherein the conductive wall section is electrically connected to a ground potential, and/or the coolant is in contact with at least one electrode that is electrically connected to a ground potential.

8. The electric machine according to claim 6, wherein the coolant is a liquid or a liquid mixture.

9. The electric machine according to claim 8, wherein at least one additive that increases the electrical conductivity is added to the liquid or the liquid mixture.

10. The electric machine according to claim 6, wherein the electric machine comprises a housing, wherein the housing has at least one connection communicating with the cooling system, with which the cooling system is connected or can be connected to a cooling circuit.

* * * * *